US010142063B2

United States Patent
Yu

(10) Patent No.: US 10,142,063 B2
(45) Date of Patent: Nov. 27, 2018

(54) HYBRID AUTOMATIC REPEAT REQUEST METHOD AND RELATED APPARATUS

(71) Applicant: Huawei Technologies Co., Ltd., Shenzhen (CN)

(72) Inventor: Rongdao Yu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 93 days.

(21) Appl. No.: 15/209,315

(22) Filed: Jul. 13, 2016

(65) Prior Publication Data

US 2016/0323068 A1    Nov. 3, 2016

Related U.S. Application Data

(63) Continuation of application No. PCT/CN2014/095268, filed on Dec. 29, 2014.

(30) Foreign Application Priority Data

Jan. 14, 2014    (CN) .......................... 2014 1 0015425

(51) Int. Cl.
*H03M 13/00* (2006.01)
*H04L 1/08* (2006.01)
(Continued)

(52) U.S. Cl.
CPC .............. *H04L 1/08* (2013.01); *H04L 1/0003* (2013.01); *H04L 1/0073* (2013.01);
(Continued)

(58) Field of Classification Search
CPC ... H04L 1/1628; H04L 1/1829; H04L 1/0073; H04L 1/08; H04L 1/1607; H04L 1/0003;
(Continued)

(56) References Cited

U.S. PATENT DOCUMENTS 6,301,249 B1    10/2001    Mansfield et al.
2002/0093937 A1   7/2002    Kim et al.
(Continued)

FOREIGN PATENT DOCUMENTS

CN    1328734 A    12/2001
CN    1394406 A    1/2003
(Continued)

OTHER PUBLICATIONS

Shigeru Fukunaga; Extended RTP Profile for RTCP-based Feedback (RTP/AVPF); 2001.*
(Continued)

*Primary Examiner* — Guerrier Merant
(74) *Attorney, Agent, or Firm* — Conley Rose, P.C.

(57) ABSTRACT

A hybrid automatic repeat request method includes receiving a packet sent by a transmit end; checking N data sub-blocks included in the packet, and generating feedback information according to a check result, where the feedback information includes N check characters corresponding to the N data sub-blocks, and the check character is an acknowledgment character ACK or a negative acknowledgment character NACK; and returning the feedback information to the transmit end. In technical solutions of the present disclosure, feedback information that includes N check characters corresponding to N data sub-blocks of a packet is used and the feedback information is returned to a transmit end, so that a data sub-block can be selected, according to the negative acknowledgment character NACK, to perform retransmission. Therefore, the transmit end can adaptively retransmit a data sub-block having an error, thereby improving resource utilization and reducing a transmission delay.

16 Claims, 4 Drawing Sheets

(51) Int. Cl.
*H04L 1/16* (2006.01)
*H04L 1/18* (2006.01)
*H04L 1/00* (2006.01)
*H04W 52/48* (2009.01)

(52) U.S. Cl.
CPC .......... *H04L 1/1607* (2013.01); *H04L 1/1614* (2013.01); *H04L 1/1628* (2013.01); *H04L 1/1829* (2013.01); *H04W 52/48* (2013.01)

(58) Field of Classification Search
CPC ... H04L 1/1614; H04L 1/0015; H04L 1/0026; H04L 1/0034; H04L 1/0051; H04L 1/0009; H04L 1/0053; H04L 1/0066; H04L 1/20; H04L 1/1812; H04L 1/1845; H04W 52/48
See application file for complete search history.

(56) References Cited

U.S. PATENT DOCUMENTS

| | | | |
|---|---|---|---|
| 2005/0068908 A1* | 3/2005 | Qian | H04L 1/1671 370/278 |
| 2005/0251721 A1 | 11/2005 | Ramesh et al. | |
| 2007/0206673 A1* | 9/2007 | Cipolli | H04L 1/1607 375/240.1 |
| 2009/0252227 A1* | 10/2009 | NepomucenoLeung | H04N 19/107 375/240.13 |
| 2009/0327831 A1 | 12/2009 | Xue et al. | |
| 2010/0080176 A1* | 4/2010 | Maas | H04L 1/0015 370/329 |
| 2010/0091735 A1* | 4/2010 | Kim | H04L 1/0041 370/331 |
| 2010/0135321 A1* | 6/2010 | Kim | H04L 1/1812 370/470 |
| 2010/0195571 A1 | 8/2010 | Kuri et al. | |
| 2012/0063382 A1* | 3/2012 | Seki | H04L 1/1887 370/312 |
| 2013/0077588 A1* | 3/2013 | Suzuki | H04W 72/0413 370/329 |
| 2013/0223485 A1 | 8/2013 | Bai et al. | |
| 2014/0053049 A1* | 2/2014 | Chen | H04L 1/0051 714/807 |

FOREIGN PATENT DOCUMENTS

| | | |
|---|---|---|
| CN | 1951053 A | 4/2007 |
| CN | 101340271 A | 1/2009 |
| CN | 101621364 A | 1/2010 |
| CN | 101667900 A | 3/2010 |
| EP | 2141851 A2 | 1/2010 |
| WO | 2005107127 A1 | 11/2005 |

OTHER PUBLICATIONS

Partial English Translation and Abstract of Chinese Patent Application No. CN101667900, Mar. 10, 2010, 29 pages.
Foreign Communication From a Counterpart Application, European Application No. 14879036.3, Extended European Search Report dated Dec. 9, 2016, 7 pages.
Foreign Communication From a Counterpart Application, PCT Application No. PCT/CN2014/095268, English Translation of International Search Report dated Apr. 1, 2015, 2 pages.
Foreign Communication From a Counterpart Application, PCT Application No. PCT/CN2014/095268, English Translation of Written Opinion dated Apr. 1, 2015, 7 pages.
Foreign Communication From a Counterpart Application, Chinese Application No. 201410015425.X, Chinese Office Action dated Jul. 31, 2017, 11 pages.
Machine Translation and Abstract of Chinese Publication No. CN101340271, Jan. 7, 2009, 17 pages.
Foreign Communication From a Counterpart Application, Chinese Application No. 201410015425.X, Chinese Office Action dated Aug. 16, 2018, 7 pages.

* cited by examiner

HYBRID AUTOMATIC REPEAT REQUEST METHOD AND RELATED APPARATUS

CROSS-REFERENCE TO RELATED APPLICATIONS

This application is a continuation of International Application No. PCT/CN2014/095268, filed on Dec. 29, 2014, which claims priority to Chinese Patent Application No. 201410015425.X, filed on Jan. 14, 2014, both of which are hereby incorporated by reference in their entireties.

TECHNICAL FIELD

The present disclosure relates to the field of communications technologies, and in particular, to a hybrid automatic repeat request method and a related apparatus.

BACKGROUND

In an existing hybrid automatic repeat request technology, after a transmit end sends a packet to a receive end, the receive end decodes the received packet; if decoding is incorrect, a negative acknowledgment character (NACK, Negative Acknowledgement) corresponding to the packet is fed back to the transmit end; or if decoding is correct, an acknowledgment character (ACK, Acknowledgement) corresponding to the packet is fed back to the transmit end. After receiving the negative acknowledgment character, the transmit end retransmits one complete packet to the receive end.

In another existing hybrid automatic repeat request technology, after receiving a negative acknowledgment character, a transmit end may sequentially attempt to send some of data in a packet according to a preset volume until a receive end returns an acknowledgment character. The second existing solution is described as follows by using an example. For example, the transmit end sends a packet having 1000 bit sequences, where the preset volume is 250 bits. When the receive end returns a negative acknowledgment character, the transmit end first sends a first group of 250-bit data to the receive end. If the receive end still returns a negative acknowledgment character corresponding to the packet, the transmit end retransmits a second group of 250-bit data. If the receive end still returns a negative acknowledgment character corresponding to the packet, the transmit end retransmits a third group of 250-bit data. If the receive end still returns a negative acknowledgment character corresponding to the packet, the transmit end retransmits a fourth group of 250-bit data. The transmit end makes continuous attempts to retransmit data to the receive end.

It is found in practice that, the existing hybrid automatic repeat request technology causes an increased transmission delay, and results in a waste of resources.

SUMMARY

Embodiments of the present disclosure provide a hybrid automatic repeat request method and a related apparatus, so as to reduce an increased transmission delay caused by an existing hybrid automatic repeat request technology and improve system resource utilization.

A first aspect of the present disclosure provides a hybrid automatic repeat request method, including receiving a packet sent by a transmit end; checking N data sub-blocks included in the packet, and generating feedback information according to a check result, where the feedback information includes N check characters corresponding to the N data sub-blocks, and the check character is an acknowledgment character ACK or a negative acknowledgment character NACK, where N is an integer greater than or equal to 2; and returning the feedback information to the transmit end.

In a first possible implementation manner, the checking N data sub-blocks included in the packet, and generating feedback information according to a check result includes decoding the N data sub-blocks included in the packet; determining whether decoding of each data sub-block is correct; if correct, generating an acknowledgment character ACK corresponding to a data sub-block that is determined as correct; or if incorrect, generating a negative acknowledgment character NACK corresponding to a data sub-block that is determined as incorrect.

With reference to the first possible implementation manner of the first aspect, in a second possible implementation manner, the determining whether decoding of each data sub-block is correct includes calculating a log likelihood ratio of each bit in each data sub-block; and determining whether log likelihood ratios of all bits in a data sub-block are greater than a preset threshold; and if yes, determining that decoding of the data sub-block is correct; otherwise, determining that decoding of the data sub-block is incorrect.

A second aspect of the present disclosure provides a hybrid automatic repeat request method, including sending a packet including N data sub-blocks to a receive end; receiving feedback information returned by the receive end, where the feedback information includes N check characters corresponding to the N data sub-blocks, and the check character is an acknowledgment character ACK or a negative acknowledgment character NACK, where N is an integer greater than or equal to 2; determining whether the feedback information includes a negative acknowledgment character NACK; and selecting, when the feedback information includes a negative acknowledgment character NACK and according to the negative acknowledgment character NACK, a data sub-block for retransmission.

In a first possible implementation manner, the selecting, when the feedback information includes a negative acknowledgment character NACK and according to the negative acknowledgment character NACK, a data sub-block for retransmission includes, when the feedback information includes a negative acknowledgment character NACK, selecting a data sub-block corresponding to the negative acknowledgment character NACK for retransmission.

In a second possible implementation manner, the method further includes, when all of the N check characters included in the feedback information and corresponding to the N data sub-blocks are negative acknowledgment characters NACK, retransmitting the packet to the receive end by reducing a modulation order, by using a space diversity transmission manner, or by improving a transmit power.

A third aspect of the present disclosure provides a receive end, including a receiving module configured to receive a packet sent by a transmit end; a check module configured to check N data sub-blocks included in the packet, and generate feedback information according to a check result, where the feedback information includes N check characters corresponding to the N data sub-blocks, and the check character is an acknowledgment character ACK or a negative acknowledgment character NACK, where N is an integer greater than or equal to 2; and a returning module configured to return the feedback information to the transmit end.

In a first possible implementation manner, the check module includes a decoding unit configured to decode the N data sub-blocks included in the packet; a determining unit configured to determine whether decoding of each data sub-block is correct; and a generating unit configured to, when the determining unit determines that the data sub-block is correct, generate an acknowledgment character ACK corresponding to the data sub-block that is determined as correct; or when the determining unit determines that the data sub-block is incorrect, generate a negative acknowledgment character NACK corresponding to the data sub-block that is determined as incorrect.

With reference to the first possible implementation manner of the third aspect, in a second possible implementation manner, the determining unit is configured to calculate a log likelihood ratio of each bit in each data sub-block; and determine whether all log likelihood ratios in a data sub-block are greater than a preset threshold, and if yes, determine that decoding of the data sub-block is correct; otherwise, determine that decoding of the data sub-block is incorrect.

A fourth aspect of the present disclosure provides a transmit end, including a sending module configured to send a packet including N data sub-blocks to a receive end; a receiving module configured to receive feedback information returned by the receive end, where the feedback information includes N check characters corresponding to the N data sub-blocks, and the check character is an acknowledgment character ACK or a negative acknowledgment character NACK, where N is an integer greater than or equal to 2; a determining module configured to determine whether the feedback information includes a negative acknowledgment character NACK, wherein the sending module is further configured to, when the feedback information includes a negative acknowledgment character NACK, select, according to the negative acknowledgment character NACK, a data sub-block for retransmission.

In a first possible implementation manner, the sending module is further configured to, when all of the N check characters included in the feedback information and corresponding to the N data sub-blocks are negative acknowledgment characters NACK, retransmit the packet to the receive end by reducing a modulation order, by using a space diversity transmission manner, or by improving a transmit power.

It can be seen from above that, in the embodiments of the present disclosure, feedback information that includes N check characters corresponding to N data sub-blocks of a packet is used and the feedback information is returned to a transmit end, so that the transmit end selects, according to the negative acknowledgment character NACK, a data sub-block for retransmission, and therefore, the transmit end can adaptively retransmit a data sub-block having an error; the retransmission is pertinent. Therefore, this improves resource utilization, reduces a transmission delay, and resolves a problem that the existing hybrid automatic repeat request technology causes an increased transmission delay and results in a waste of resources.

BRIEF DESCRIPTION OF THE DRAWINGS

To describe the technical solutions in the embodiments of the present disclosure more clearly, the following briefly introduces the accompanying drawings required for describing the embodiments and the prior art. The accompanying drawings in the following description show merely some embodiments of the present disclosure, and a person of ordinary skill in the art may still derive other drawings from these accompanying drawings without creative efforts.

DETAILED DESCRIPTION

Embodiments of the present disclosure provide a hybrid automatic repeat request method, so as to resolve a problem that an existing hybrid automatic repeat request technology causes an increased transmission delay and results in a waste of resources. The embodiments of the present disclosure further provide a corresponding receive end and transmit end.

To make a person skilled in the art understand the technical solutions in the present disclosure better, the following clearly and completely describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Detailed descriptions are separately provided in the following by means of specific embodiments.

Figure 1:
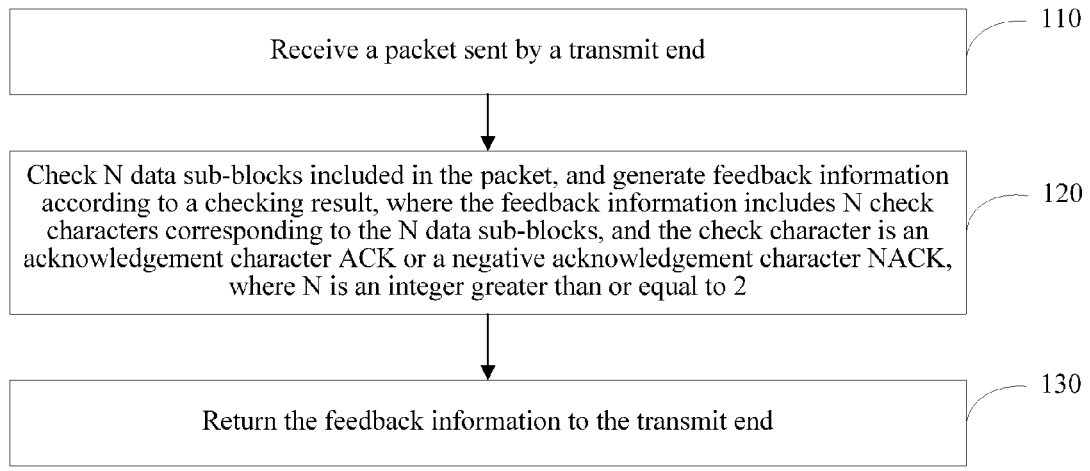
FIG. 1 is a schematic diagram of a basic process of a hybrid automatic repeat request method according to an embodiment of the present disclosure.

Referring to FIG. 1, an embodiment of the present disclosure provides a hybrid automatic repeat request method, which may include the following steps.

110: Receive a packet sent by a transmit end.

In some embodiments of the present disclosure, when sending packets to a receive end, after finishing sending one packet, the transmit end may wait for feedback information returned by the receive end. After receiving the feedback information, the transmit end determines whether the feedback information includes a negative acknowledgment character NACK. If the feedback information includes a negative acknowledgment character NACK, the transmit end selects, according to the negative acknowledgment character NACK, a data sub-block for retransmission, where the data sub-block selected, according to the negative acknowledgment character NACK, for retransmission may include only a data sub-block corresponding to the negative acknowledgment character NACK, or include at least a data sub-block corresponding to the negative acknowledgment character NACK. If the feedback information includes no negative acknowledgment character NACK, the transmit end continues to send a next packet. Because a receiver and a transmitter perform operations on only one same packet at a same time, this method is easy to implement, corresponding signaling overheads are low, and a requirement on a buffer capacity of the receive end is low.

In some embodiments of the present disclosure, when sending packets to a receive end, after finishing sending one packet to the receive end, instead of stopping to wait for feedback information, the transmit end continues to send several packets. The receive end returns feedback information for each packet, where the feedback information not only includes N check characters corresponding to N data sub-blocks of each of the packets that are sent continuously, but also includes a serial number of each packet, where the serial numbers of packets are used by a receiver and a transmitter to differentiate and identify different packets. If feedback information of a single packet includes a negative acknowledgment character NACK, the transmit end selects, according to a serial number of the single packet, N check characters corresponding to N data sub-blocks of the single packet, and the negative acknowledgment character NACK in the single packet, a data sub-block for retransmission. Moreover, the data sub-block selected, according to the negative acknowledgment character NACK in the single packet, for retransmission may include only a data sub-block corresponding to the negative acknowledgment character NACK in the single packet, or include at least a data sub-block corresponding to the negative acknowledgment character NACK in the single packet. In the method, because the transmit end sends data continuously, a throughput of a system can be improved, thereby improving channel utilization.

120: Check N data sub-blocks included in the packet, and generate feedback information according to a check result, where the feedback information includes N check characters corresponding to the N data sub-blocks, and the check character is an acknowledgment character ACK or a negative acknowledgment character NACK, where N is an integer greater than or equal to 2.

In some embodiments of the present disclosure, when the receive end checks the packet, if a check character is a negative acknowledgment character, a data sub-block corresponding to the negative acknowledgment character is discarded; or if a check character is an acknowledgment character, a data sub-block corresponding to the acknowledgment character may be stored in a buffer. A data sub-block is selected, according to the negative acknowledgment character NACK, for retransmission, and the data sub-block that is selected, according to the negative acknowledgment character NACK in the single packet, for retransmission may include only a data sub-block corresponding to the negative acknowledgment character NACK in the single packet, or include at least a data sub-block corresponding to the negative acknowledgment character NACK in the single packet. After the receive end confirms that the retransmitted data sub-block is correct, the data sub-block in the buffer and the retransmitted data sub-block are reassembled into a complete packet.

In some embodiments of the present disclosure, a quantity of data sub-blocks included in a packet, and a specific feedback manner and rule for feedback information may be negotiated by a receiver and a transmitter. However, at least, it needs to be ensured that the quantity N of data sub-blocks is an integer greater than or equal to 2. Data sub-blocks in the packet may be data sub-blocks having a same volume, or may be data sub-blocks having different volumes, which is not intended to limit the present disclosure herein.

In some embodiments of the present disclosure, in step 120, the checking N data sub-blocks included in the packet, and generating feedback information according to a check result includes decoding the N data sub-blocks included in the packet; determining whether decoding of each data sub-block is correct; if correct, generating an acknowledgment character ACK corresponding to a data sub-block that is determined as correct; or if incorrect, generating a negative acknowledgment character NACK corresponding to a data sub-block that is determined as incorrect.

In some embodiments of the present disclosure, the determining whether decoding of each data sub-block is correct includes calculating a log likelihood ratio (LLR) of each bit in each data sub-block; and determining whether all log likelihood ratios in a data sub-block are greater than a preset threshold; and if yes, determining that decoding of the sub-block is correct; otherwise, determining that decoding of the sub-block is incorrect.

In some embodiments of the present disclosure, the log likelihood ratio is a log likelihood ratio LLR of each bit in several data sub-blocks, which is expressed as follows:

$$LLR(x) = \log\left(\frac{P(x=0\mid r)}{P(x=1\mid r)}\right)$$

where r is a received code word, x is a received bit, P(x=0|r) represents a possibility that x=0 on the condition of the received code word r, and P(x=1|r) represents a possibility that x=1 on the condition of the received code word r.

Alternatively, the log likelihood ratio is expressed as follows:

$$LLR = \log\left(\frac{P(x=1\mid r)}{P(x=0\mid r)}\right).$$

The calculation of the log likelihood ratio relates to only operations of addition and subtraction, and therefore, the calculation is simple and is easy to implement.

130: Return the feedback information to the transmit end.

Therefore, the transmit end selects, according to the negative acknowledgment character NACK, a data sub-block for retransmission.

In some embodiments of the present disclosure, the data sub-block selected by the transmit end according to the negative acknowledgment character NACK may include only a data sub-block corresponding to the negative acknowledgment character NACK, or include at least a data sub-block corresponding to the negative acknowledgment character NACK.

In different protocols, different ACKs and NACKs may be used. In some feasible implementation manners of the present disclosure, a bit "1" may be used as the ACK, and a bit "0" may be used as the NACK. Certainly, the bit "0" may also be used the ACK, and the bit "1" may also be used as the NACK, which is very simple and convenient. It may be understood that, other single-bit characters may be used as the ACK and NACK, and multiple-bit characters may also be used as the ACK and NACK, as long as different characters are used for the ACK and NACK.

It may be understood that, the foregoing solutions of the embodiments of the present disclosure may be implemented on a device such as a mobile terminal or a base station.

To make the technical solutions provided by the embodiments of the present disclosure more comprehensible, a description is provided in the following by using an implementation manner in a specific scenario as an example.

Figure 2:
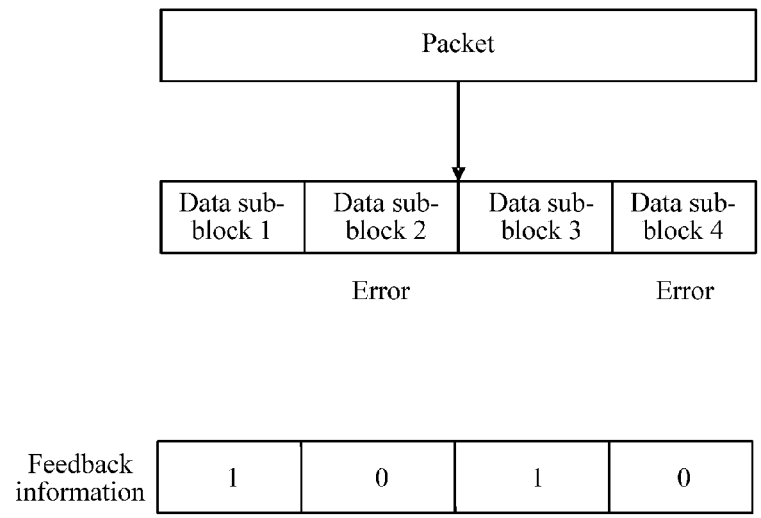
FIG. 2 is a schematic diagram of an example of an application scenario according to an embodiment of the present disclosure.

Referring to FIG. 2, for example, a packet received by a receive end includes four data sub-blocks, that is, a data sub-block 1, a data sub-block 2, a data sub-block 3, and a data sub-block 4. After receiving the packet, the receive end checks the four data sub-blocks; and if it is found, by means of checking, that the data sub-block 2 and the data sub-block 4 have an error, four check characters of feedback information are ACK, NACK, ACK, and NACK. "1010" in the foregoing manner may be used and fed back to a transmit end; the receive end discards the data sub-block 2 and data sub-block 4 that have an error, and buffers the correct data sub-block 1 and data sub-block 3. After receiving the feedback information, the transmit end determines that the data sub-block 2 and the data sub-block 4 have an error, and therefore, retransmits the data sub-block 2 and the data sub-block 4. It may be understood that, in a case in which resources are sufficient, the transmit end may further select the data sub-block 1, the data sub-block 2, and the data sub-block 4 for retransmission, or may select the data sub-block 2, the data sub-block 3, and the data sub-block 4 for retransmission together. After receiving the retransmitted data sub-block 2 and data sub-block 4, the receive end reassembles the data sub-block 2 and data sub-block 4 with the data sub-block 1 and the data sub-block 3 that are in the buffer to form a complete packet.

It can be seen from above that, in some feasible implementation manners of the present disclosure, feedback information that includes N check characters corresponding to N data sub-blocks of a packet is used and the feedback information is returned to a transmit end, so that the transmit end selects, according to the negative acknowledgment character NACK, a data sub-block for retransmission, and therefore, the transmit end can adaptively retransmit a data sub-block having an error; the retransmission is pertinent, thereby improving resource utilization and reducing a transmission delay.

Figure 3:
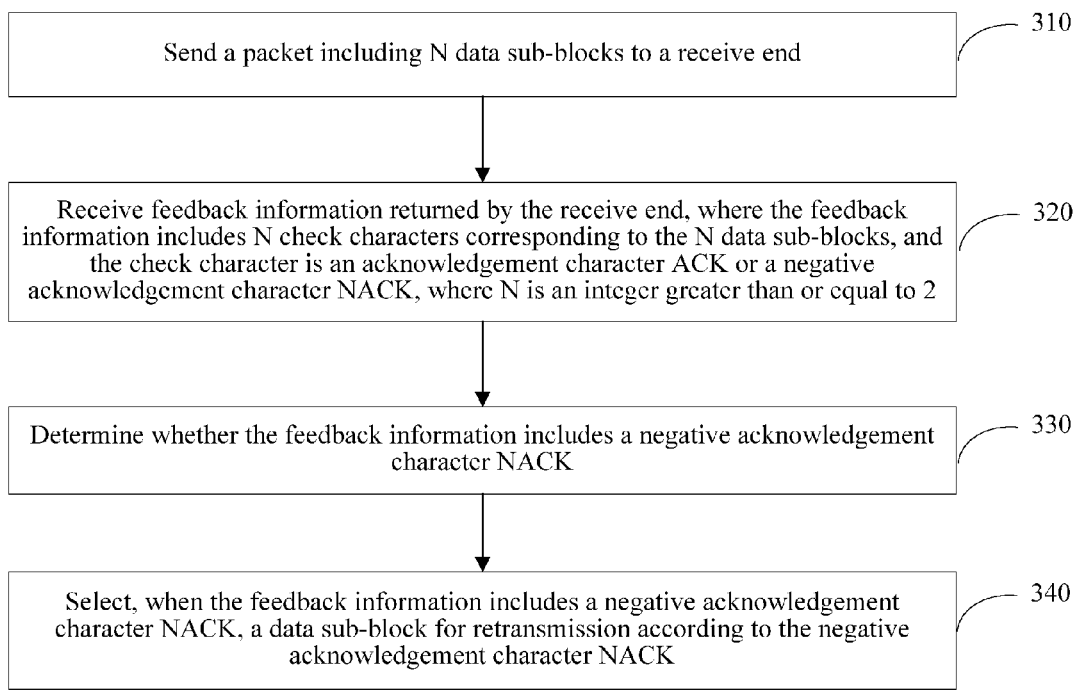
FIG. 3 is a schematic diagram of a basic process of another hybrid automatic repeat request method according to an embodiment of the present disclosure.

Referring to FIG. 3, another hybrid automatic repeat request method according to an embodiment of the present disclosure may include the following steps.

310: Send a packet including N data sub-blocks to a receive end.

320: Receive feedback information returned by the receive end, where the feedback information includes N check characters corresponding to the N data sub-blocks, and the check character is an acknowledgment character ACK or a negative acknowledgment character NACK, where N is an integer greater than or equal to 2.

330: Determine whether the feedback information includes a negative acknowledgment character NACK.

340: Select, when the feedback information includes a negative acknowledgment character NACK and according to the negative acknowledgment character NACK, a data sub-block for retransmission.

In some embodiments of the present disclosure, the selecting, when the feedback information includes a negative acknowledgment character NACK and according to the negative acknowledgment character NACK, a data sub-block for retransmission includes, when the feedback information includes a negative acknowledgment character NACK, selecting a data sub-block corresponding to the negative acknowledgment character NACK to perform retransmission.

In some embodiments of the present disclosure, the data sub-block selected according to the negative acknowledgment character NACK by the transmit end for retransmission may include only a data sub-block corresponding to the negative acknowledgment character NACK, or include at least a data sub-block corresponding to the negative acknowledgment character NACK.

In some embodiments of the present disclosure, the method further includes, when all of the N check characters included in the feedback information and corresponding to the N data sub-blocks are negative acknowledgment characters NACK, retransmitting the packet to the receive end by reducing a modulation order, by using a space diversity transmission manner, or by improving a transmit power, or directly retransmitting the packet to the receive end.

In the manner of reducing a modulation order, when a packet is sent by using a 64 quadrature amplitude modulation (QAM) manner last time, a 16 QAM manner is used during retransmission of the packet; and when a packet is sent by using a 16 QAM manner last time, a quaternary phase shift keying (QPSK) manner is used during retransmission of the packet.

The space diversity transmission manner is mainly for a multiple input multiple output (MIMO) transmission manner. When a packet is sent by using a spatial multiplexing manner in the MIMO transmission manner last time, the space diversity transmission manner is used during retransmission of the packet.

A signal-to-noise ratio may be improved and an error ratio may be reduced by improving a transmit power of the transmit end.

It can be seen from above that, in some feasible implementation manners of the present disclosure, a packet including N data sub-blocks is sent to a receive end; the receive end returns feedback information, where the feedback information includes N check characters corresponding to the N data sub-blocks of the packet; and a data sub-block may be selected, according to a negative acknowledgment character NACK, for retransmission. A data sub-block having an error can be adaptively retransmitted, and the retransmission is pertinent, thereby improving resource utilization and reducing a transmission delay.

To better implement the foregoing solutions in the embodiments of the present disclosure, the following further provides related apparatuses configured to cooperatively implement the foregoing solutions.

Figure 4:
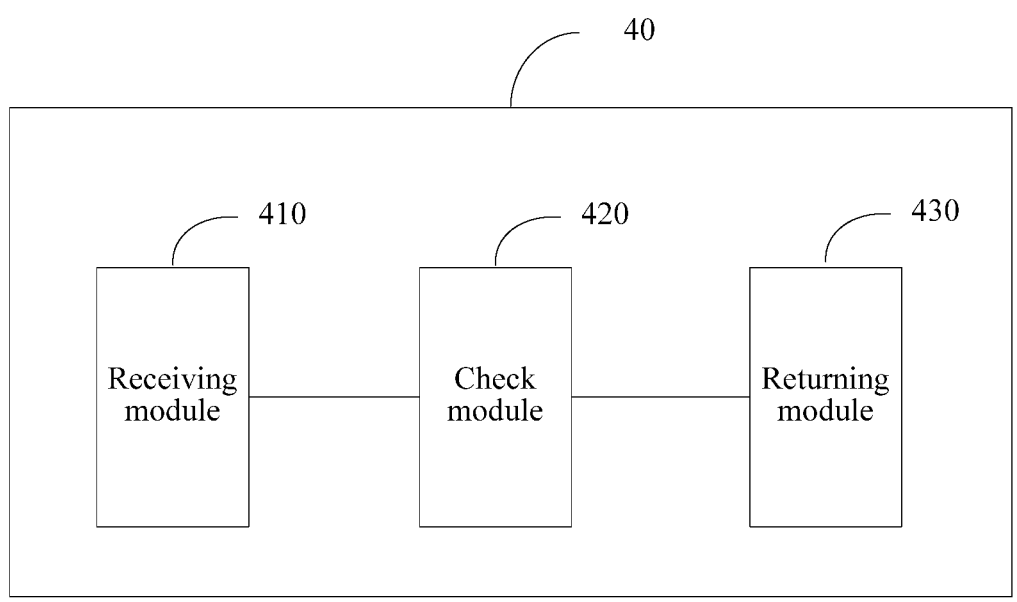
FIG. 4 is a schematic diagram of a basic logical structure of a receive end according to an embodiment of the present disclosure.

Referring to FIG. 4, an embodiment of the present disclosure provides a receive end 40, which may include a receiving module 410 configured to receive a packet sent by a transmit end; a check module 420 configured to check N data sub-blocks included in the packet, and generate feedback information according to a check result, where the feedback information includes N check characters corresponding to the N data sub-blocks, and the check character is an acknowledgment character ACK or a negative acknowledgment character NACK, where N is an integer greater than or equal to 2; and a returning module 430 configured to return the feedback information to the transmit end.

Therefore, the transmit end selects, according to the negative acknowledgment character NACK, a data sub-block for retransmission.

In some embodiments of the present disclosure, the data sub-block selected by the transmit end according to the negative acknowledgment character NACK may include only a data sub-block corresponding to the negative acknowledgment character NACK, or include at least a data sub-block corresponding to the negative acknowledgment character NACK.

Figure 5:
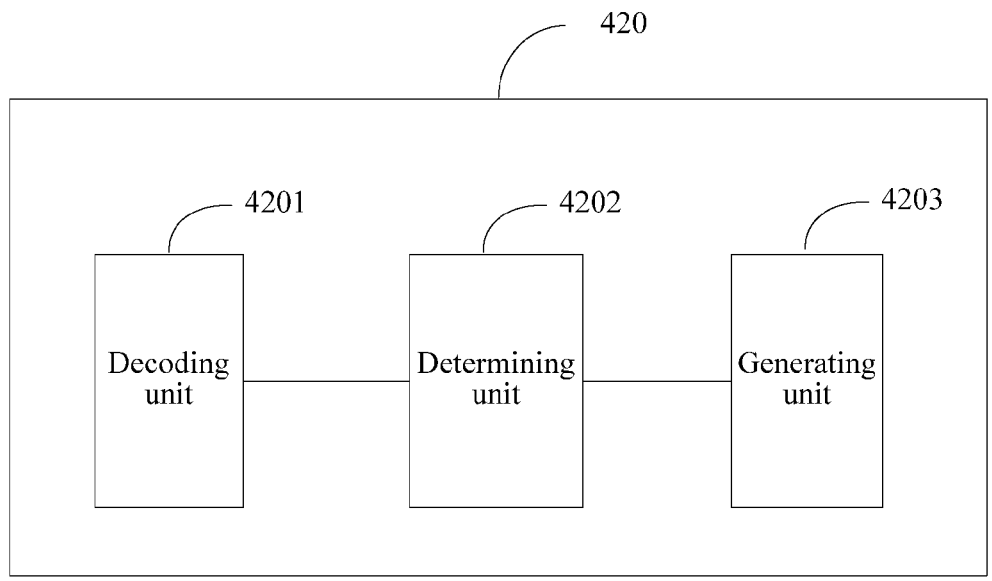
FIG. 5 is a schematic diagram of another basic logical structure of a receive end according to an embodiment of the present disclosure.

Referring to FIG. 5, in some embodiments of the present disclosure, the check module 420 may further include a decoding unit 4201 configured to decode the N data sub-blocks included in the packet; a determining unit 4202 configured to determine whether decoding of each data sub-block is correct; and a generating unit 4203 configured to, when the determining unit determines that the data sub-block is correct, generate an acknowledgment character ACK corresponding to the data sub-block that is determined as correct; or when the determining unit determines that the data sub-block is incorrect, generate a negative acknowledgment character NACK corresponding to the data sub-block that is determined as incorrect.

In some embodiments of the present disclosure, the determining unit is configured to calculate a log likelihood ratio of each bit in each data sub-block; and determine whether all log likelihood ratios in a data sub-block are greater than a preset threshold; and if yes, determine that decoding of the data sub-block is correct; otherwise, determine that decoding of the data sub-block is incorrect.

The receive end in this embodiment of the present disclosure may be a device such as a mobile terminal or a base station.

It may be understood that, functions of functional modules of the receive end in this embodiment of the present disclosure may be implemented according to the method in the foregoing method embodiment. For specific implementation processes thereof, reference may be made to related descriptions in the foregoing method embodiment, which are not described herein again.

It can be seen from above that, in some feasible implementation manners of the present disclosure, feedback information that includes N check characters corresponding to N data sub-blocks of a packet is used and the feedback information is returned to a transmit end, so that the transmit end selects, according to the negative acknowledgment character NACK, a data sub-block for retransmission, and therefore, the transmit end can adaptively retransmit a data sub-block having an error, and the retransmission is pertinent, thereby improving resource utilization and reducing a transmission delay.

Figure 6:
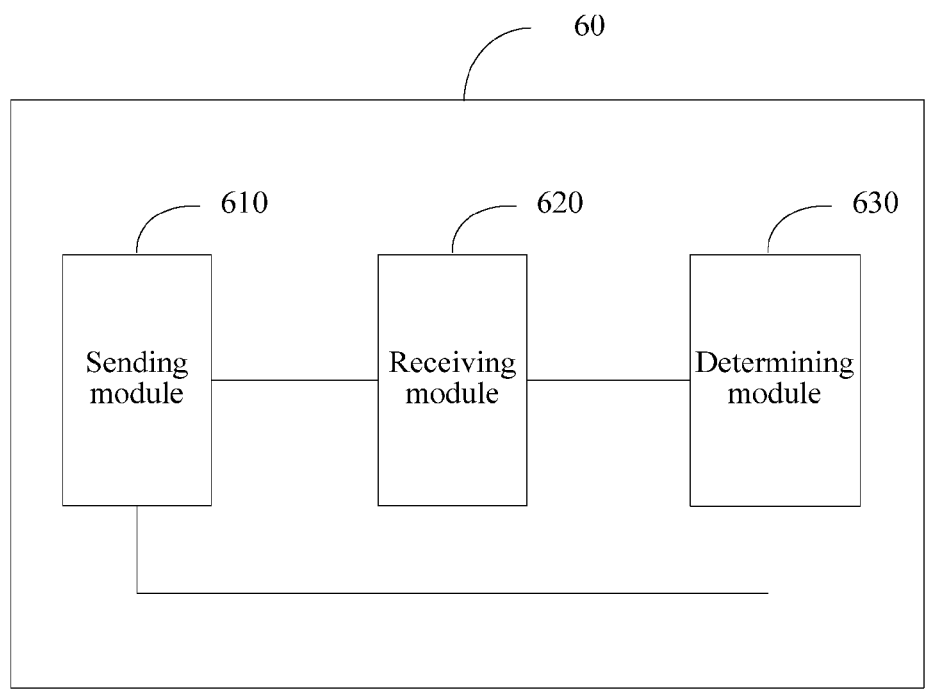
FIG. 6 is a schematic diagram of a basic logical structure of a transmit end according to an embodiment of the present disclosure.

Referring to FIG. 6, an embodiment of the present disclosure provides a transmit end 60, which may include a sending module 610 configured to send a packet including N data sub-blocks to a receive end; a receiving module 620 configured to receive feedback information returned by the receive end, where the feedback information includes N check characters corresponding to the N data sub-blocks, and the check character is an acknowledgment character ACK or a negative acknowledgment character NACK, where N is an integer greater than or equal to 2; a determining module 630 configured to determine whether the feedback information includes a negative acknowledgment character NACK, where the sending module 610 is further configured to, when the feedback information includes a negative acknowledgment character NACK, select, according to the negative acknowledgment character NACK, a data sub-block for retransmission.

In some embodiments of the present disclosure, the sending module 610 may further be configured to, when the feedback information includes a negative acknowledgment character NACK, select a data sub-block corresponding to the negative acknowledgment character NACK to perform retransmission.

In some embodiments of the present disclosure, the data sub-block selected according to the negative acknowledgment character NACK by the transmit end for retransmission may include only a data sub-block corresponding to the negative acknowledgment character NACK, or include at least a data sub-block corresponding to the negative acknowledgment character NACK.

In some embodiments of the present disclosure, the sending module 610 is further configured to, when all of the N check characters included in the feedback information and corresponding to the N data sub-blocks are negative acknowledgment characters NACK, retransmit the packet to the receive end by reducing a modulation order, by using a space diversity transmission manner, or by improving a transmit power; or directly retransmit the packet to the receive end.

The transmit end in this embodiment of the present disclosure may be a device such as a mobile terminal or a base station.

It can be seen from above that, in some feasible implementation manners of the present disclosure, a packet including N data sub-blocks is sent to a receive end; the receive end returns feedback information, where the feedback information includes N check characters corresponding to the N data sub-blocks of the packet; and a data sub-block may be selected, according to the negative acknowledgment character NACK, for retransmission; a data sub-block having an error can be adaptively retransmitted, and the retransmission is pertinent, thereby improving resource utilization and reducing a transmission delay.

In the foregoing embodiments, the description of each embodiment has respective focuses. For a part that is not described in detail in an embodiment, reference may be made to related descriptions in other embodiments.

It should be noted that, for ease of description, the foregoing method embodiments are described as a series of action combinations. However, a person skilled in the art should understand that the present disclosure is not limited to the described sequence of the actions, because some steps may be performed in another sequence or performed at the same time according to the present disclosure. In addition, a person skilled in the art should also understand that the embodiments described in this specification all belong to exemplary embodiments, and the involved actions and modules are not necessarily mandatory to the present disclosure.

A person of ordinary skill in the art may understand that all or a part of the steps of the methods in the embodiments may be implemented by a program instructing relevant hardware. The program may be stored in a computer readable storage medium. The storage medium may include a read-only memory (ROM), a random-access memory (RAM), a magnetic disk, or an optical disc.

The hybrid automatic repeat request method, the transmit end and the receive end provided in the embodiments of the present disclosure are described in detail above. The principle and implementation of the present disclosure are described herein through specific examples. The description about the embodiments of the present disclosure is merely provided to help understand the method and core ideas of the present disclosure. In addition, persons of ordinary skill in the art can make variations and modifications to the present disclosure in terms of the specific implementations and application scopes according to the ideas of the present disclosure. Therefore, the content of specification shall not be construed as a limit to the present disclosure.

What is claimed is:

1. A hybrid automatic repeat request method, comprising:
   receiving a packet from a transmit end, the packet comprising N data sub-blocks, and N comprising an integer greater than or equal to two;
   checking the N data sub-blocks comprised in the packet to generate a check result for each of the N data sub-blocks, the check result for each of the N data sub-blocks indicating whether each of the N data sub-blocks is correct or incorrect;

buffering a first portion of the N data sub-blocks that have the check result indicating that the data sub-blocks are correct;

discarding a second portion of the N data sub-blocks that have the check result indicating that the data sub-blocks are incorrect;

generating feedback information according to the check result for each of the N data sub-blocks, the feedback information comprising N check characters and N serial numbers corresponding to the N data sub-blocks, each of the N check characters comprising an acknowledgment character (ACK) or a negative acknowledgment character (NACK), and each of the N serial numbers differentiating and identifying one of the N data sub-blocks;

returning the feedback information to the transmit end;

receiving a second packet from the transmit end that comprises retransmitted data sub-blocks corresponding to the second portion of the N data sub-blocks that were discarded; and assembling the first portion of the N data sub-blocks with the data sub-blocks from the second packet to form a third packet having correct data.

2. The method of claim 1, wherein checking the N data sub-blocks comprised in the packet and generating the feedback information according to the check result comprise:

decoding the N data sub-blocks comprised in the packet;

determining whether decoding of each data sub-block is correct;

generating the ACK corresponding to a data sub-block whose decoding is determined as correct when the decoding is correct; and generating the NACK corresponding to a data sub-block whose decoding is determined as incorrect when the decoding is incorrect.

3. The method of claim 2, wherein determining whether the decoding of each data sub-block is correct comprises:

calculating a log likelihood ratio of each bit in each data sub-block;

determining whether log likelihood ratios of all bits in a data sub-block are greater than a preset threshold;

determining that decoding of the data sub-block is correct when the log likelihood ratios are greater than the preset threshold; and determining that decoding of the data sub-block is incorrect when the log likelihood ratios are not greater than the preset threshold.

4. A hybrid automatic repeat request method, comprising:

sending a packet comprising N data sub-blocks to a receive end, the packet comprising N data sub-blocks, and N comprising an integer greater than or equal to two;

receiving feedback information from the receive end, the feedback information comprising N check characters and N serial numbers corresponding to the N data sub-blocks, each of the N check characters comprising an acknowledgment character (ACK) or a negative acknowledgment character (NACK), and each of the N serial numbers differentiating and identifying one of the N data sub-blocks;

determining whether the feedback information comprises the NACK;

selecting, according to the NACK, a data sub-block for retransmission when the feedback information comprises the NACK; and sending a second packet to the receive end that only comprises data sub-blocks corresponding to the NACK and does not comprise data sub-blocks corresponding to the ACK.

5. The method of claim 4, wherein selecting, according to the NACK, the data sub-block for retransmission when the feedback information comprises the NACK comprises selecting a data sub-block corresponding to the NACK to perform retransmission when the feedback information comprises the NACK.

6. The method of claim 4, wherein the method further comprises retransmitting the packet to the receive end by reducing a modulation order when all of the N check characters comprised in the feedback information and corresponding to the N data sub-blocks are NACKs.

7. The method of claim 4, wherein the method further comprises retransmitting the packet to the receive end when all of the N check characters comprised in the feedback information and corresponding to the N data sub-blocks are NACKs.

8. The method of claim 4, wherein the method further comprises retransmitting the packet to the receive end by improving a transmit power when all of the N check characters comprised in the feedback information and corresponding to the N data sub-blocks are NACKs.

9. A receive end, comprising:

a non-transitory computer readable medium having instructions stored thereon; and a computer processor coupled to the non-transitory computer readable medium and configured to execute the instructions to:

receive a packet from a transmit end, the packet comprising N data sub-blocks, and N comprising an integer greater than or equal to two;

check the N data sub-blocks comprised in the packet to generate a check result for each of the N data sub-blocks, the check result for each of the N data sub-blocks indicating whether each of the N data sub-blocks is correct or incorrect;

buffering a first portion of the N data sub-blocks that have the check result indicating that the data sub-blocks are correct;

discarding a second portion of the N data sub-blocks that have the check result indicating that the data sub-blocks are incorrect;

generate feedback information according to the check result for each of the N data sub-blocks, the feedback information comprising N check characters and N serial numbers corresponding to the N data sub-blocks, each of the N check characters comprising an acknowledgment character (ACK) or a negative acknowledgment character (NACK), and each of the N serial numbers differentiating and identifying one of the N data sub-blocks;

return the feedback information to the transmit end;

receive a second packet from the transmit end that comprises retransmitted data sub-blocks corresponding to the second portion of the N data sub-blocks that were discarded; and assemble the first portion of the N data sub-blocks with the data sub-blocks from the second packet to form a third packet having correct data.

10. The receive end of claim 9, wherein the computer processor is configured to execute the instructions to:

decode the N data sub-blocks comprised in the packet;
determine whether decoding of each data sub-block is correct;
generate the ACK corresponding to the data sub-block that is determined as correct; and
generate the NACK corresponding to the data sub-block that is determined as incorrect.

11. The receive end of claim 10, wherein the computer processor is configured to execute the instructions to:
calculate a log likelihood ratio of each bit in each data sub-block;
determine whether all log likelihood ratios in a data sub-block are greater than a preset threshold;
determine that decoding of the data sub-block is correct when all log likelihood ratios in the data sub-block are greater than the preset threshold; and
determine that decoding of the data sub-block is incorrect when all log likelihood ratios in the data sub-block are not greater than the preset threshold.

12. The method of claim 1, wherein packets are received continuously from the transmit end.

13. The method of claim 1, wherein each of the data sub-blocks comprises a same volume.

14. The method of claim 1, wherein the data sub-blocks comprise different volumes.

15. The method of claim 3, wherein the log likelihood ratios are calculated according to an equation:

$$LLR(x) = \log\left(\frac{P(x=0 \mid r)}{P(x=1 \mid r)}\right),$$

r is a received code word, x is a received bit, P(x=0|r) represents a possibility that x=0 on a condition of the received code word r, and P(x=1|r) represents a possibility that x=1 on a condition of the received code word r.

16. The method of claim 3, wherein the log likelihood ratios are calculated according to an equation:

$$LLR = \log\left(\frac{P(x=1 \mid r)}{P(x=0 \mid r)}\right)$$

r is a received code word, x is a received bit, P(x=0|r) represents a possibility that x=0 on a condition of the received code word r, and P(x=1|r) represents a possibility that x=1 on a condition of the received code word r.

* * * * *